United States Patent [19]

Kamp

[11] Patent Number: 4,605,190
[45] Date of Patent: Aug. 12, 1986

[54] CANE KEEPER

[76] Inventor: Harry W. Kamp, 1552 Cornell Rd., Muskegon, Mich. 49441

[21] Appl. No.: 680,316

[22] Filed: Dec. 10, 1984

[51] Int. Cl.⁴ .............................................. E04G 3/00
[52] U.S. Cl. .............................. 248/316.7; 248/231.8
[58] Field of Search .................. 248/316.7, 316.1, 113, 248/360, 230, 231.8, 229, 541, 539; 211/89, 60.1, 70.6; 135/65, 66; 224/252, 269

[56] References Cited

U.S. PATENT DOCUMENTS

| | | | |
|---|---|---|---|
| 520,135 | 5/1894 | Commins | 224/252 X |
| 1,246,492 | 11/1917 | Thiele | 248/113 |
| 1,530,180 | 3/1925 | Holmes | 248/316.7 X |
| 2,926,403 | 3/1960 | Weissman | 224/269 X |
| 3,531,072 | 9/1970 | Lindquist | 248/316.7 |
| 3,724,795 | 4/1973 | Callanan | 248/231.8 X |
| 3,937,373 | 2/1976 | Artz | 224/252 X |
| 4,121,798 | 10/1978 | Schumacher et al. | 248/113 |
| 4,136,848 | 1/1979 | McCollum | 248/316.7 |
| 4,300,742 | 11/1981 | Hunn | 248/316.1 |
| 4,453,656 | 6/1984 | Gillum | 224/252 X |

FOREIGN PATENT DOCUMENTS 0120523  11/1945  Australia .......................... 248/316.7

Primary Examiner—Ramon O. Ramirez

[57] ABSTRACT

This device is designed to be secured to counters, so as to receive and support a walking cane, thus providing comfort and ease for the cane owner, when conducting business in banks, stores, etc. Primarily, it consists of a main body, having an adhesive means for adhering it to a counter surface, and an opening is included through the forward portion, for frictionally receiving the shaft of the cane.

1 Claim, 8 Drawing Figures

U.S. Patent  Aug. 12, 1986  4,605,190
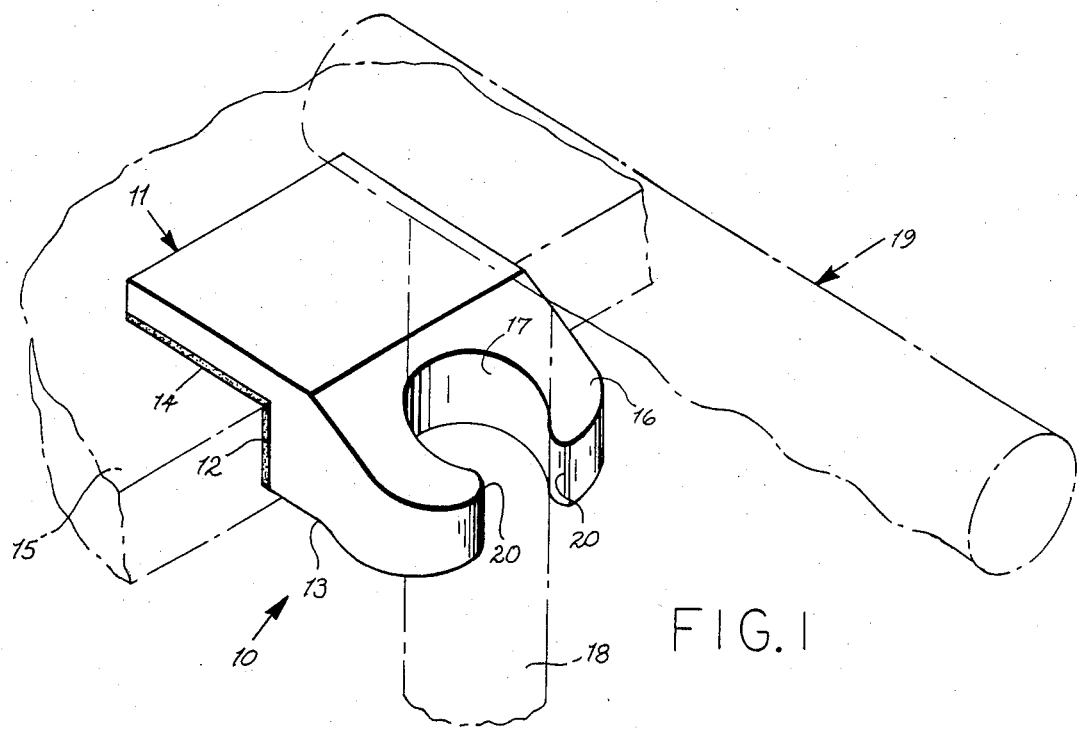
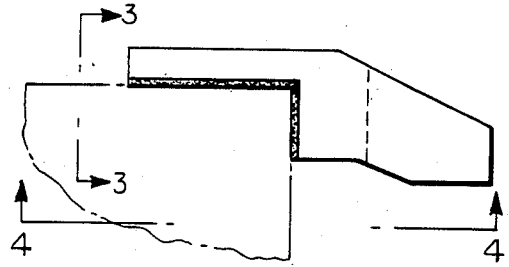
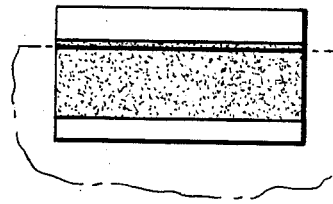
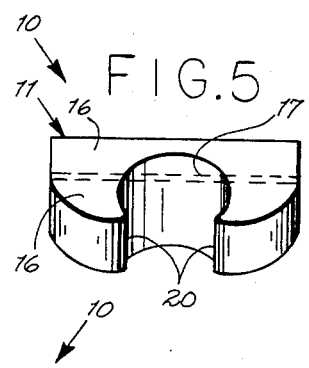
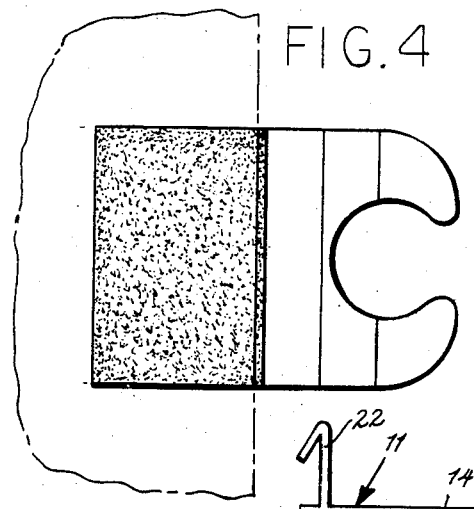
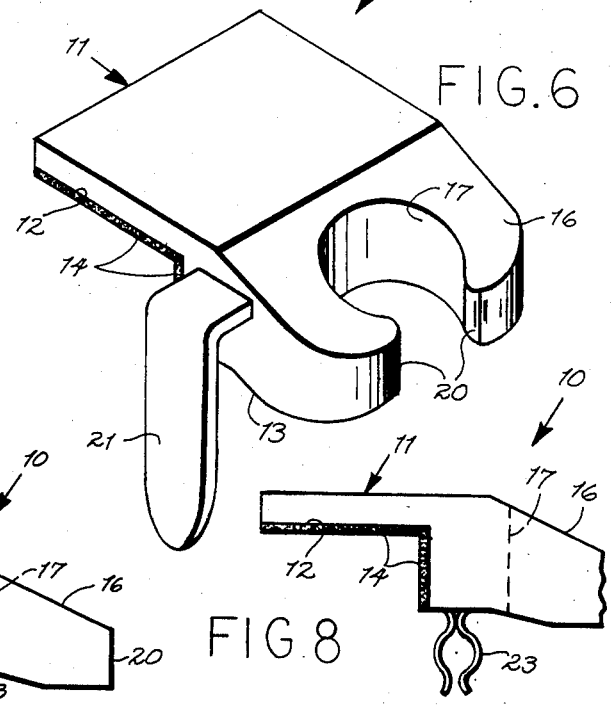

CANE KEEPER

This invention relates to support devices, and more particularly, to a cane keeper.

The principal object of this invention is to provide a cane keeper, which will be of such design, as to support and retain a person's cane, while he or she conducts business with ease.

Another object of this invention is to provide a cane keeper, which will be of such design, as to adhere to most counter surfaces, without defacing the surface.

Another object of this invention is to provide a cane keeper, which will be installed at such a level, as to be of no hazard to children, and it will be particularly adaptable for use at tellers' counters in banks, at deposit and withdrawal stations in banks, at cashier counters in restaurants, motels, department stores, etc.

People who have to use canes, have no alternative but to try to balance their canes in a vertical position against the counter, and, more times than not, it falls to the floor. It is difficult to walk with a cane, without the added burden of bending over to retrieve it. Thus, there is an immediate need for such a device.

A further object of this invention is to provide a cane keeper, which may well lend itself as a good customer service advertising item for major credit card companies, insurance companies, etc.

A further object of this invention is to provide a cane keeper, which will also be adaptable to support an umbrella, when needed.

Other objects are to provide a cane keeper, which is simple in design, inexpensive to manufacture, rugged in construction, easy to use, and efficient in operation.

These, and other objects, will be readily evident, upon a study of the following specification, and the accompanying drawing, wherein:

FIG. 1 is a perspective view of the present invention, shown installed to a counter, and the cane and counter are illustrated in phantom lines;

FIG. 2 is a side elevational view of FIG. 1, showing the cane removed therefrom;

FIG. 3 is a view taken along the line 3—3 of FIG. 2;

FIG. 4 is a view taken along the line 4—4 of FIG. 2;

FIG. 5 is a front elevational view of the invention;

FIG. 6 is a perspective view of a modified form of the invention;

FIG. 7 is a side elevational view of another form of the invention, and

FIG. 8 is a side elevational view of still another modified form of the invention.

Accordingly, a keeper device 10 is shown to include a main body 11, fabricated of a suitable resilient plastic material, for non-marring of articles, and preventing possible injury to anyone. A cut-out 12, in the rear portion of the bottom surface 13, is provided, and a pair of suitable adhesive pads 14 are fixedly secured thereto, for fastening device 10 to the edge portion of counter 15. The front top surface 16 is chamfered downward, and a cut-out opening 17 is defined in the front of device 10, for freely receiving the shaft 18 of a cane 19, and the frontal portion of the opening 17 includes a radius 20, so as not to mar the finish of the shaft 18 of cane 19. It shall be noted, that cane shafts of various diameters may be received within opening 17.

In use, the main body 11 of device 10 is adhered to the counter 15 by the adhesive pads 14, and the shaft 18 of cane 19 is pushed into the opening 17 from the radius 20 portions, and the resiliency of device 10 causes the shaft 18 to be retained therein, until it is desired to remove same therefrom.

Looking now at FIG. 6, device 10 is modified to include a downward extending tongue 21, for depending device 10 from one's belt, pocket, pants-top, or purse, when a counter is not available, and it shall also be noted, that when cane 19 is received in device 10, it will support the cane 19, by just placing the cut-out 12 portion on a counter edge.

In use, the tongue 21 is inserted behind a person's belt or elsewhere, where it will hook on, so as to support cane 19 received therein.

Looking now at FIG. 7, device 10 is modified to have a hook 22, which is suitably fixedly secured in the top rear of main body 11, for hooking to a device or article.

In use, the hook 22 is engaged with any suitable article, so as to support device 10 and cane 19 therein.

Looking now at FIG. 8, device 10 is modified to include a spring clamp 23, which is suitably fixedly secured in the bottom surface 13, for clamping on to anything suitable.

In use, clamp 23 is used to clamp device 10 onto a suitable article, and device 10 still retains the cane 19, as was heretofore described of all of the embodiments of the present invention.

While various changes may be made in the detail construction, it is understood that such changes will be within the spirit and scope of the present invention, as is defined by the appended claims.

I claim:

1. A cane keeper, comprising, in combination, a main body made of a resilient plastic material, a right angle shaped cut-out along a rear lower portion of said main body for fitting around a right angle corner of a supporting object, a top wall of said main body being horizontally flat at its rearward portion and being angularly, donwardly forwardly inclined at its front portion, an upper side of said cut-out being parallel with said rearward portion of said main body top wall and a forward side of said cut-out being downwardly perpendicular, a pair of adhesive pads at right angle to each other, one said pad lining each said side of said cut-out for adhering to a top surface and a side surface of said supporting object, and a generally circular notch on a front wall of said main body having a narrowed front entry for a vertical cane being slidably received therethrough and into said notch.

* * * * *